United States Patent
Banton et al.

(10) Patent No.: US 8,330,965 B2
(45) Date of Patent: Dec. 11, 2012

(54) MARKING ENGINE SELECTION

(75) Inventors: Martin E. Banton, Fairport, NY (US); Dale R. Mashtare, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 1690 days.

(21) Appl. No.: 11/403,785

(22) Filed: Apr. 13, 2006

(65) Prior Publication Data
US 2007/0242287 A1 Oct. 18, 2007

(51) Int. Cl.
*G06K 15/10* (2006.01)

(52) U.S. Cl. ........ 358/1.1; 358/1.14; 358/1.15; 358/1.9; 358/1.8; 347/211; 347/19; 399/8; 399/9; 399/82

(58) Field of Classification Search ............ 358/1.8, 358/1.15, 296, 1.1, 1.9, 1.13, 3.26, 1.14; 347/19, 41, 3, 211; 709/201; 399/8, 9, 82
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,008,713 A | 4/1991 | Ozawa et al. | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |
| 5,596,416 A * | 1/1997 | Barry et al. | 358/296 |
| 5,629,762 A | 5/1997 | Mahoney et al. | |

(Continued)

FOREIGN PATENT DOCUMENTS

JP 07148999 6/1995

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Hilina S Kassa
*Assistant Examiner* — Ashish K Thomas
(74) *Attorney, Agent, or Firm* — Fay Sharpe LLP

(57) ABSTRACT

A multi-functional multi-engine print platform engines schedules and processes job in order to minimize visibility of image defects. The print platform includes at least two marking engines that process jobs, a marking engine analyzer that determines image quality defects of the at least two marking engines, and a scheduler that creates a plan to process a job with the at least two marking engines based at least on the image quality defects each of the at least two marking engines in order to minimize visibility of the defects in images reproduced by the at least two marking engine.

17 Claims, 6 Drawing Sheets

U.S. PATENT DOCUMENTS

| | | | |
|---|---|---|---|
| 5,710,968 | A | 1/1998 | Clark et al. |
| 5,778,377 | A | 7/1998 | Marlin et al. |
| 5,884,910 | A | 3/1999 | Mandel |
| 5,995,721 | A | 11/1999 | Rourke et al. |
| 6,036,300 | A * | 3/2000 | Suzuki et al. ............ 347/41 |
| 6,059,284 | A | 5/2000 | Wolf et al. |
| 6,125,248 | A | 9/2000 | Moser |
| 6,188,423 | B1 * | 2/2001 | Pou ............ 347/211 |
| 6,241,242 | B1 | 6/2001 | Munro |
| 6,297,886 | B1 | 10/2001 | Cornell |
| 6,341,773 | B1 | 1/2002 | Aprato et al. |
| 6,384,918 | B1 | 5/2002 | Hubble, III et al. |
| 6,398,328 | B1 * | 6/2002 | Silverbrook ............ 347/3 |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,606,165 | B1 * | 8/2003 | Barry et al. ............ 358/1.9 |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,722,751 | B2 * | 4/2004 | Barr et al. ............ 347/19 |
| 6,819,906 | B1 | 11/2004 | Herrmann et al. |
| 6,925,283 | B1 | 8/2005 | Mandel et al. |
| 6,959,165 | B2 | 10/2005 | Mandel et al. |
| 6,973,286 | B2 | 12/2005 | Mandel et al. |
| 7,024,152 | B2 | 4/2006 | Lofthus et al. |
| 7,493,055 | B2 * | 2/2009 | German et al. ............ 399/9 |
| 2002/0078012 | A1 | 6/2002 | Ryan et al. |
| 2002/0089691 | A1 * | 7/2002 | Fertlitsch et al. ............ 358/1.15 |
| 2002/0103559 | A1 | 8/2002 | Gartstein |
| 2003/0077095 | A1 | 4/2003 | Conrow |
| 2004/0012818 | A1 * | 1/2004 | Bauer ............ 358/3.26 |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |
| 2005/0225586 | A1 * | 10/2005 | Brenner ............ 347/19 |
| 2006/0033771 | A1 | 2/2006 | Lofthus et al. |
| 2006/0039728 | A1 | 2/2006 | deJong et al. |
| 2006/0284916 | A1 * | 12/2006 | Heiles et al. ............ 347/19 |
| 2009/0257077 | A1 * | 10/2009 | German ............ 358/1.14 |

OTHER PUBLICATIONS

Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/137,273, filed May 25, 2005, Anderson et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/212,367, filed Aug. 26, 2005, Anderson et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/235,979, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/236,099, filed Sep. 27, 2005, Anderson et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/358,663, filed Feb. 21, 2006, Mashtare et al.
European Patent Application No. 07105934.9 European Search Report mailed Aug. 21, 2008 (3 pages).

* cited by examiner

MARKING ENGINE SELECTION

CROSS REFERENCE TO RELATED PATENTS AND APPLICATIONS

The following patents/applications, the disclosures of each being totally incorporated herein by reference are mentioned:

application Ser. No. 11/212,367, filed Aug. 26, 2005, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

application Ser. No. 11/235,979, filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

application Ser. No. 11/236,099, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/000,168, filed Nov. 30, 2004, entitled "ADDRESSABLE FUSING AND HEATING METHODS AND APPARATUS," by David K. Biegelsen, et al.;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. application Ser. No. 11/069,020, filed Feb. 28, 2004, entitled "PRINTING SYSTEMS," by Robert M. Lofthus, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/109,558, filed Apr. 19, 2005, entitled "SYSTEMS AND METHODS FOR REDUCING IMAGE REGISTRATION ERRORS," by Michael R. Furst, et al.;

U.S. application Ser. No. 11/109,996, filed Apr. 20, 2005, entitled "PRINTING SYSTEMS," by Michael C. Mongeon, et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/122,420, filed May 5, 2005, entitled "PRINTING SYSTEM AND SCHEDULING METHOD" by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. application Ser. No. 11/143,818, filed Jun. 2, 2005, entitled "INTER-SEPARATION DECORRELATOR," by Edul N. Dalal, et al.;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/189,371, filed Jul. 26, 2005, entitled "PRINTING SYSTEM," by Steven R. Moore, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS," by Goodman, et al.;

U.S. application Ser. No. 11/234,553, filed Sep. 23, 2005, entitled "MAXIMUM GAMUT STRATEGY FOR THE PRINTING SYSTEMS," by Michael C. Mongeon;

U.S. application Ser. No. 11/234,468, filed Sep. 23, 2005, entitled "PRINTING SYSTEM," by Eric Hamby, et al.;

U.S. application Ser. No. 11/247,778, filed Oct. 11, 2005, entitled "PRINTING SYSTEM WITH BALANCED CONSUMABLE USAGE," by Charles Radulski, et al.;

U.S. application Ser. No. 11/274,638, filed Nov. 15, 2005, entitled "GAMUT SELECTION IN MULTI-ENGINE SYSTEMS," by Wencheng Wu, et al.;

U.S. application Ser. No. 11/287,177, filed Nov. 23, 2005, entitled "MEDIA PASS THROUGH MODE FOR MULTI-ENGINE SYSTEM," by Barry P. Mandel, et al.;

U.S. application Ser. No. 11/291,860, filed Nov. 30, 2005, entitled "MEDIA PATH CROSSOVER CLEARANCE FOR PRINTING SYSTEM," by Keith L. Willis;

U.S. application Ser. No. 11/292,388, filed Nov. 30, 2005, entitled "PRINTING SYSTEM," by David A. Mueller;

U.S. application Ser. No. 11/292,163, filed Nov. 30, 2005, entitled "RADIAL MERGE MODULE FOR PRINTING SYSTEM," by Barry P. Mandel, et al.;

U.S. application Ser. No. 11/314,828, filed Dec. 21, 2005, entitled "MEDIA PATH DIAGNOSTICS WITH HYPER MODULE ELEMENTS," by David G. Anderson, et al;

U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen;

U.S. application Ser. No. 11/317,167, filed Dec. 23, 2005, entitled "PRINTING SYSTEM," by Robert M. Lofthus, et al.;

U.S. application Ser. No. 11/341,733, filed Jan. 27, 2006, entitled "PRINTING SYSTEM AND BOTTLENECK OBVIATION", by Kristine A. German;

U.S. application Ser. No. 11/363,378, filed Feb. 27, 2006, entitled "SYSTEM FOR MASKING PRINT DEFECTS", by Anderson, et al.;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.;

U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.; and U.S. application Ser. No. 11/399,100, filed Apr. 6, 2006, entitled "SYSTEMS AND METHODS TO MEASURE BANDING PRINT DEFECTS", by Peter Paul.

BACKGROUND

The following relates to print platforms. It finds particular application to selectively distributing portions of a job to one or more marking engines based at least on one or more characteristics of the marking and/or the job. More particularly, it relates to selecting a marking engine, from a plurality of marking engines, to minimize the visibility of marking engine image defects.

In conventional xerography, an electrostatic latent image is created on the surface of a photoconducting insulator and subsequently transferred to a final receiving substrate or medium. This typically involves the following. An electrostatic charge is deposited on the photoreceptor surface (e.g., by a corona discharge). The photoreceptor is exposed, which selectively dissipates the surface charge in the exposed regions and creates a latent image in the form of an electrostatic charge pattern. The image is developed by transferring electrostatically charged toner particles to the photoreceptor surface. The toner particles are then transferred to a receiving substrate or to one or more intermediate transfer elements and then to the receiving substrate. The transferred image is made permanent by various techniques, including pressure, heat, radiation, solvent, or some combination thereof.

With conventional multi-marking engine systems (xerographic or other), one or more portions of a print job may be distributed across at least two marking engines. In many instances, one or more of the marking engines may be in an unhealthy state such that the images they reproduce include defects such as streaks, non-uniformities, etc. One technique used to reduce such defects to a negligible level is to not use the marking engine(s) that creates such defects when the job includes portions that are susceptible to the defects exhibited by the marking engine(s). Thus, during the planning phase for a job, the scheduler may simply ignore and/or not consider such marking engine(s). As a consequence, the marking engine(s) remains idle even though it is not inoperative. This can result in reduced availability, throughput, and system productivity.

BRIEF DESCRIPTION

In one aspect, a multi-functional multi-engine print platform is illustrated. The print platform includes at least two marking engines that process jobs, a marking engine analyzer that determines image quality defects of the at least two marking engines, and a scheduler that creates a plan to process a job with the at least two marking engines based at least on the image quality defects each of the at least two marking engines in order to minimize visibility of the defects in images reproduced by the at least two marking engine.

DETAILED DESCRIPTION

Figure 1:
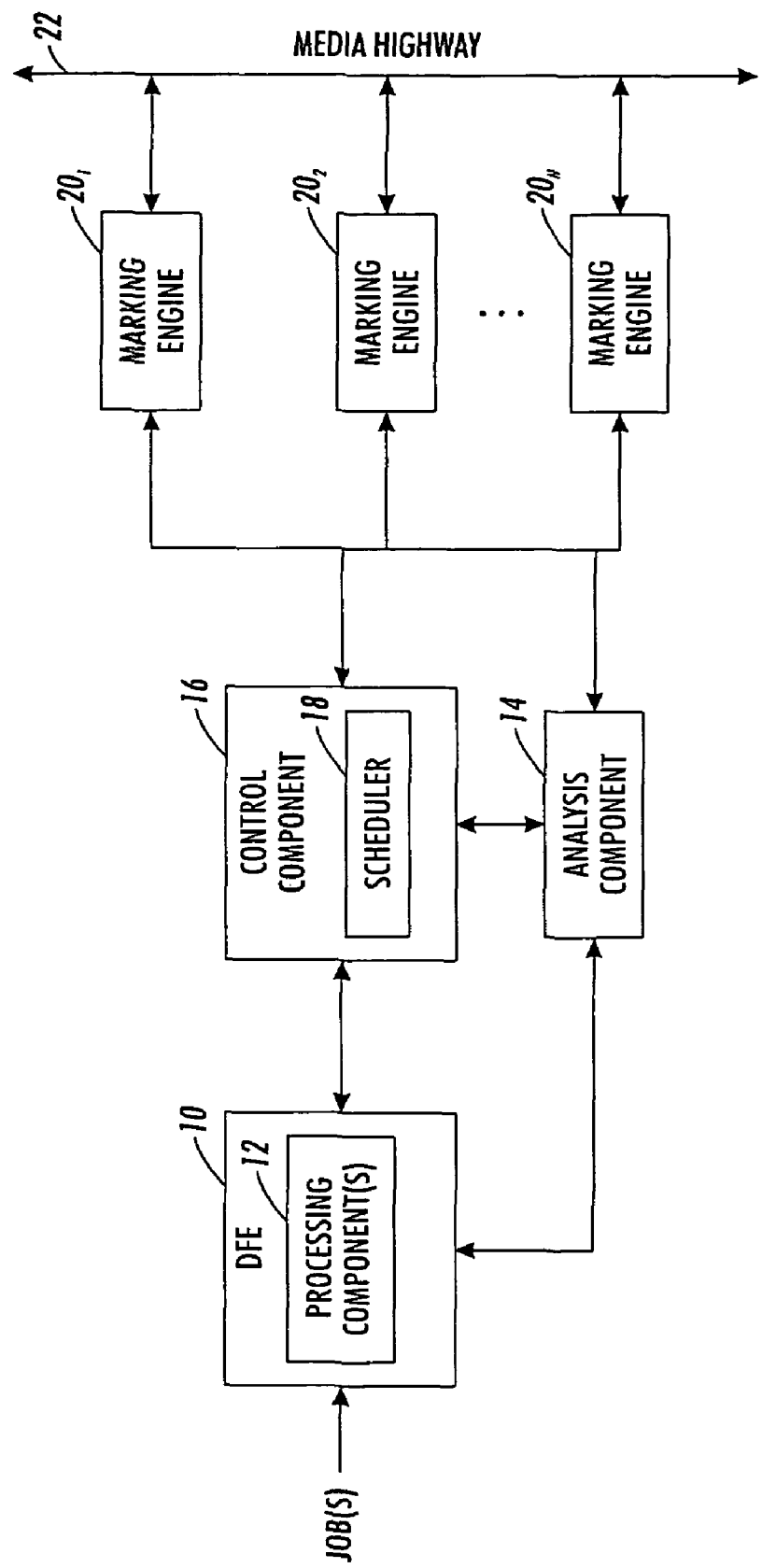
FIG. 1 illustrates a print platform with an analyzer that obtains information about its marking engines and/or the content of received jobs to facilitate creating a plan to process the jobs.

With reference to FIG. 1, a portion of a print platform is illustrated. The print platform can be a multi-purpose platform having capabilities such as printing, scanning, copying, faxing, emailing, etc. simplex and/or duplex pages with color, black and white, highlight color, etc. portions within each side of each page. In addition, the print platform can include one or more independent modules (e.g., printers) that are interconnected in parallel and/or series to provide concurrent and/or serial processing of one or more jobs. Such modules may be independent in that each module is capable of processing a job(s) independently of the other modules. Each module can include one or more marking engines, and each marking engine can be associated with similar and/or different attributes (e.g., processing rate, a type(s) of toner, etc).

The print platform leverages one or more of the attributes, a health (or marking state), etc. of one or more of the marking engines, the content (e.g., location of solid color areas, range of color present, etc.) of jobs to process, characteristics of the print media (e.g., paper weight, size, orientation, etc.), and/or other information to improve image quality and system productivity. For example, such information can be used to minimize the visibility of defects such as streaks, non-uniformities, etc. on each processed page. In another example, such information can be used to maximize the processing capabilities by minimizing marking engine idle time. It is to be appreciated that such features can be employed prior to, concurrent with, and/or after other known techniques for improving image quality and/or system performance.

The print platform includes a digital front end (DFE) 10 having one or more processing components 12 that process received print jobs. Such jobs can originate from various sources. For example, one or more jobs can be obtained from portable storage medium such as CD, DVD, optical disk, Flash memory, stick memory, magnetic tape, floppy disk, etc. In another example, one or more jobs can be received (via wire or wirelessly) over a bus, a network, or the like from a computer, another print platform, an email server, a facsimile, etc. In another example, the job can be created via a user interface (not shown) of the print platform.

Each received job can include one or more pages in which each page can include black and white, highlight color, color, etc. portions, text, graphics, pictures, etc. Each of the one or more processing components 12 is capable of determining such content and converting, translating, re-formatting, transforming, etc. one or more of the received jobs into a suitable form (e.g., from RGB, postscript, etc. to CMYK, etc.) for further processing by the print platform. In order to facilitate the foregoing, each of the one or more processing components 12 can include and/or be associated with one or more raster image processors (RIPs), memory, etc.

An analysis component 14 is also able to determine the content of each received file. The analysis component 14 can do this through analyzing the received jobs and/or the jobs processed (e.g., converted, etc.) by the one or more processing components 12. In addition, the analysis component 14 can instruct the one or more processing components 12 to determine such information and convey this information (and the job) to a control component 16 and/or the analysis component 14. The analysis component 14 can also convey this information to the control component 16. Such job content analysis can be periodically performed, for example, each time a new job is received, on-demand, at a pre-determined frequency, on the occurrence of an event (e.g., upon a change to a marking engine capability), etc.

The control component 16 includes a scheduler 18 that determines a strategy for processing the jobs with one or more marking engines $20_1, 20_2, \ldots, 20_N$ (wherein N is an integer equal to or greater than one). The marking engines $20_1, 20_2, \ldots, 20_N$, are collectively referred to herein as the marking engines 20. Each of the marking engines 20 is associated with one or more processing elements such as one or more cleaners, chargers, expose units, developers, photoreceptors, intermediate transfer elements, etc. for reproducing images with similar or different toners (e.g., color, black and white, highlight color, etc.) at similar and/or different processing rates. Upon processing one or more portions of one or more jobs by one or more of the marking engines 20, those portions are inserted into a media highway or path 22 (which can be wholly contained within the print platform, distributed amongst different print engines, for example, in a cluster or distributed configuration, etc.) and forwarded (e.g., automatically via the media path 22, manually via a user, etc.) to another one of the marking engines 20 and/or various other components such as a fuser, a finisher, an output tray, a shredder, etc. for further processing.

Each of the marking engines 20 is associated with similar and/or different features such as a page per minute processing rate, a type(s) of toner, image resolution, image quality, etc. Such features typically specified through operating ranges and the like. A health of each of the marking engines 20 can be determined based on execution of one or more of the features and corresponding operational ranges. For instance, one image quality metric may include determining whether the reproduced image includes visible defects, for example, artifacts such as undesired streaks and/or non-uniformities that are not part of the image. When one or more of the marking engines 20 begin generating images with such defects, those marking engines 20 can be deemed unhealthy. Marking engines 20 that reproduce images without and/or with minimally visible defects can be deemed healthy. The foregoing example is provided for explanatory purposes and is not limiting. Other information that can be used to facilitate determining the health of the marking engines 20 includes electrical, optical, and/or mechanical characteristics.

In one instance, the analysis component 14 determines the health of each of the marking engines 20. This can be achieved through analyzing the image being marked as various locations such as on a photoreceptor (belt, drum, etc.), an intermediate transfer element, print media, etc. This can also be achieved through measuring and analyzing electrical characteristics (e.g., resistance, impedance, voltage, current, etc.) and/or invoking mechanical components and monitoring their response. In another instance, the analysis component 14 invokes test routines, diagnostic software, etc. that facilitate determining the health of each of the marking engines 20. For example, a diagnostic routine may include sending a test pattern to one or more of the marking engines 20. Before, during and/or after processing of the test pattern, the analysis component 20 can monitor and/or measure various characteristics of the cleaner, the charger, the expose unit, the developer, the photoreceptor, etc. The health information is provided to the control component 16 by the analysis component 14 and/or the one or more of the marking engines 20. The analysis component 14 can also be used to determine real-time information such as processing load, etc. of each of the marking engines 20 at any moment in time. This information can also be provided to the control component 16.

As briefly discussed above, the scheduler 20 determines the strategy for processing the jobs with the marking engines 20 and distributes one or more portions of each job to one or more of the marking engines 20 for processing. Such strategy can be based on various factors. In one non-limiting instance, the strategy involves minimizing re-producing images with visible defects such as streaking, non-uniformities, unacceptable color variations, etc. To achieve such results, the scheduler 18 can leverage the marking engine health and/or the job content information when developing the strategy. Such information can be used to determine which of the marking engines 20 will process which portion of a job.

By way of example, if the job includes a page with a solid color area (e.g., saturated or not), a marking engine that introduces defects such as streaks in such area may be by-passed for a marking engine that can mark such areas without introducing streaks. However, the marking engine susceptible to introducing streaks in the solid color area may be selected to process a different portion of the job and/or another job in which the different portion does not include solid color areas. Thus, using such marking engine and/or job content information can improve image quality through minimizing the visibility of defects and improve productivity and extend marking engine useful life by enabling use of a marking engine that would otherwise be idle due to the system processing a job with content that is sensitive to the defect(s) that are exhibited by that marking engine.

The print system can additionally and/or alternatively use other techniques to facilitate reducing the visibility of defects such as, but not limited to, those described in patent application Ser. No. 11/358,663 filed on Feb. 21, 2006 and entitled "SYSTEM AND METHOD FOR MINIMIZING VISIBILITY OF PRINT DEFECTS," which is incorporated in its entirety herein by reference. For example, the orientation (e.g., rotation and/or translation) of the image data and/or print media can be suitably changed to minimize the visibility of defects like streaks. For instance, the print media orientation may be changed from long edge feed to short edge feed in order to minimize the visibility of various defects in the final image.

Figure 2:
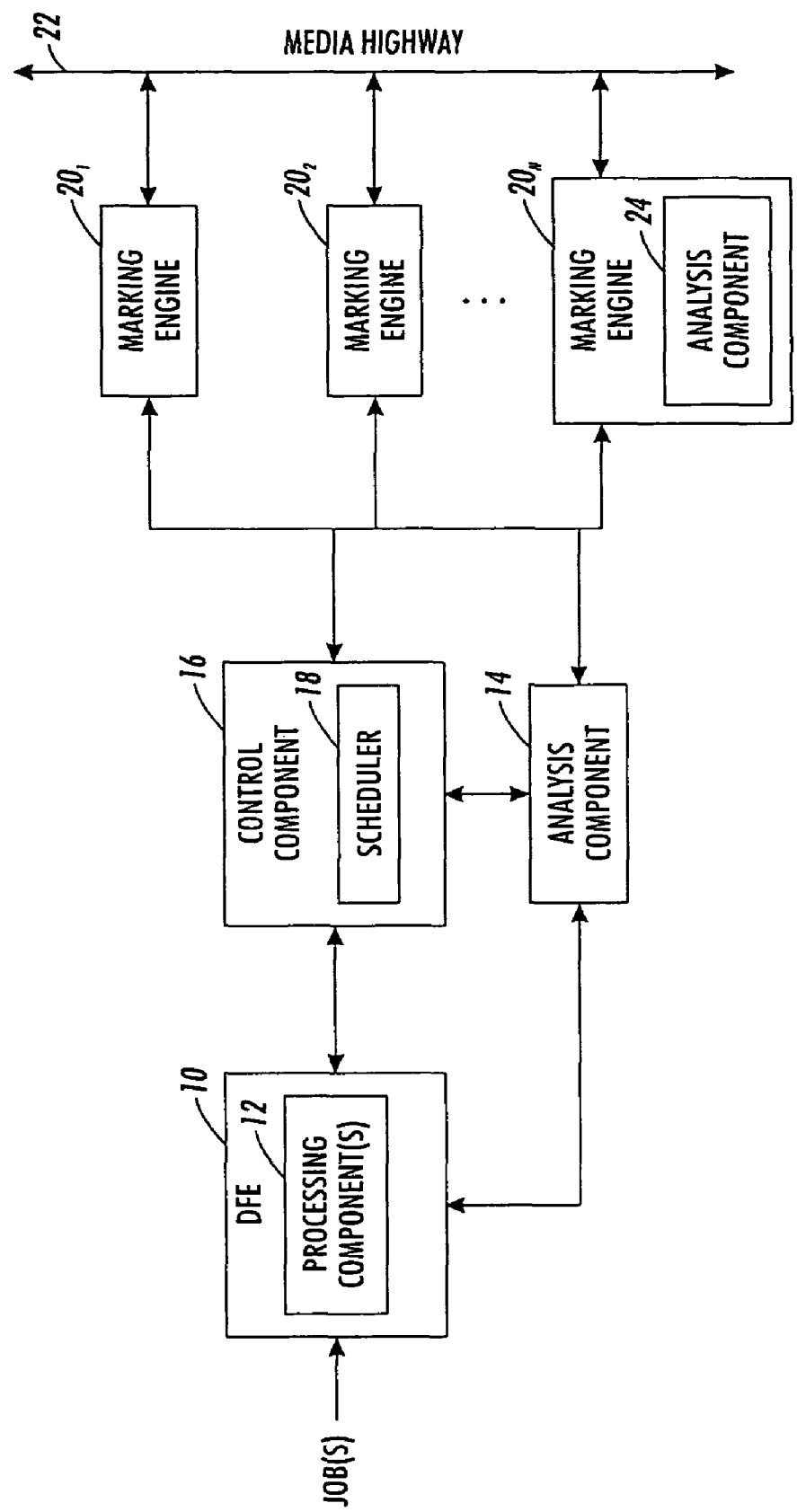
FIG. 2 illustrates a print platform in which each marking engine may include an analyzer that obtains information about its health.

In FIG. 2, at least one of the marking engines 20 optionally includes an analysis component. In this example, the marking engine $20_N$ includes an analysis component 24. Similar to the analysis component 14, the analysis component 24 can facilitate determining the health of its corresponding marking engine $20_N$. For example, the analysis component 24 can measure and/or monitor image quality (e.g., via scanning and processing), electrical, optical, mechanical, etc. characteristics of the marking engine $20_N$ and/or invoke test routines and/or diagnostics that facilitate determining the health. Such information can be determined in real-time as the marking engine $20_N$ is processing a portion of a job, at periodic intervals, and/or upon one or more predetermined events.

This information can be provided to the control component 16 along with the information obtained by the analysis component 14 (e.g., marking engine health and/or job content) and/or the processing components 12 (e.g., job content). The scheduler 18 can then additionally and/or alternatively use the information obtained by the analysis component 24 when creating the plan to process the job. It is to be appreciated that in some instances, each of the marking engines 20 includes its own analysis component 24. In addition, in these instances, the analysis component 14 may or may not be included and/or used to determine marking engine health. Rather, each of the marking engines 20 would use its corresponding analysis component and/or an analysis component of another of the marking engines 20 to determine its health. In these instances, the analysis component 14 can simply not be used, used as a back up system, used to capture redundant information, used to valid results, not be included within the print system, etc.

Figure 3:
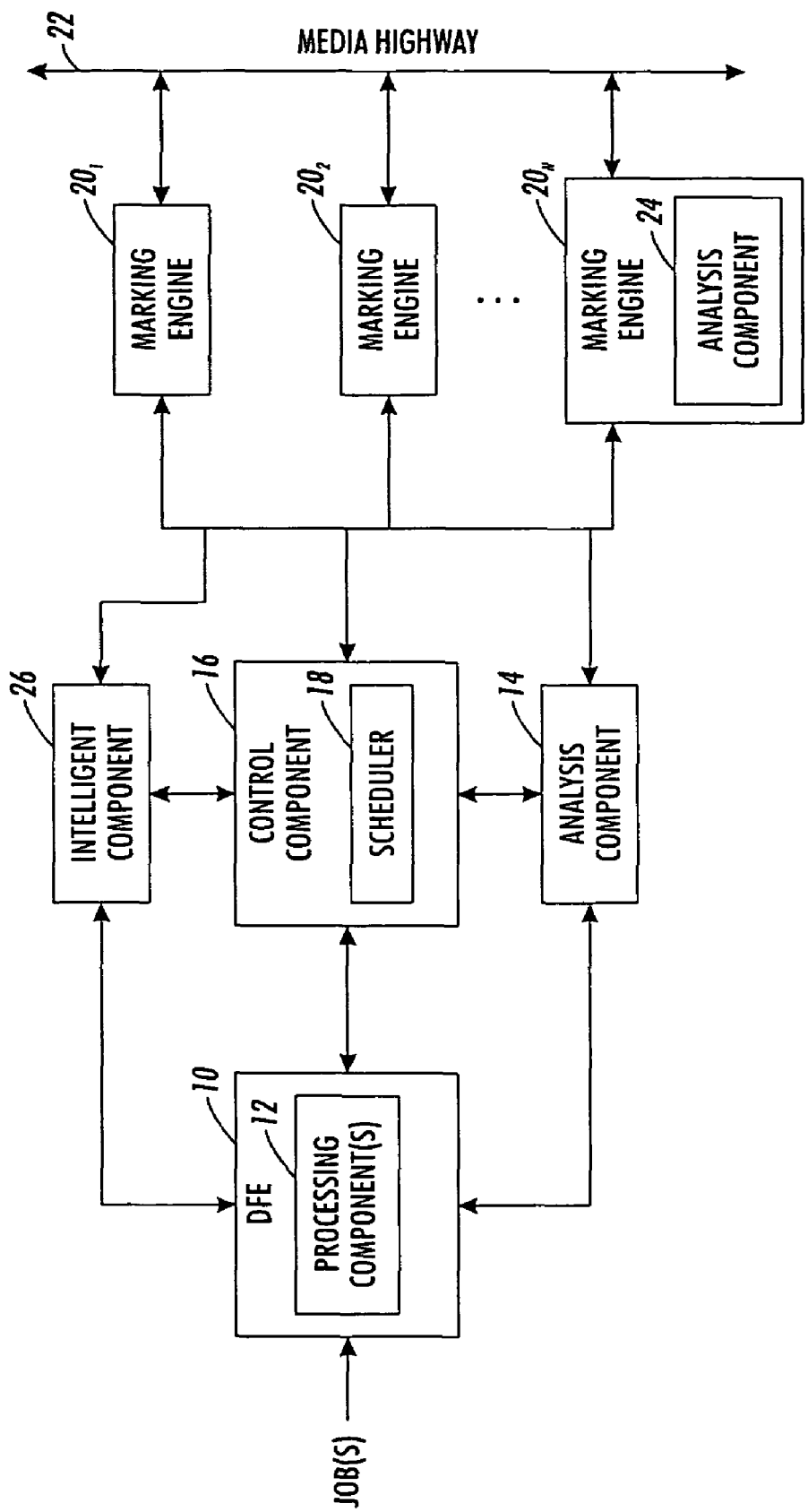
FIG. 3 illustrates a print platform that employs an intelligence component to facilitate determining marking engine health and/or job content.

In FIG. 3, the system further includes an intelligent component 26 that employ statistics, probabilities, classifiers, neural networks, and the like to facilitate determining, anticipating, predicting, etc. the health of one or more of the marking engines 20 and/or the content of one or more received jobs, and/or creating the plan(s) to process the job(s). In order to facilitate such, the intelligent component 26 can interact with the DFE 10, the control component 16, and/or one or more of the marking engines 20. The print system optionally can include the analysis component 14 and/or the analysis component 24.

For example, the intelligent component 26 can monitor image quality, electrical, optical, mechanical, etc. characteristics of each of the marking engines 20. Such data can be compared against similar measurements from healthy, unhealthy, and inoperable marking engines. The results can be tracked and any trends that indicate a marking engine is transitioning from a healthy state to an unhealthy or inoperable state can be identified. The print system may send a notification (e.g., a text message, an email, a phone call, a page, a web post, etc.) to a user, a system administrator, a service technician, etc. apprising such individual(s) that one or more of the marking engines may need service and/or replacement. In another example, the intelligent component 26 can monitor job characteristics such as file size, creator, source, etc., construct patterns based on such information, and use the patterns to anticipate, predict, etc. the content of a newly received job.

Figure 4:
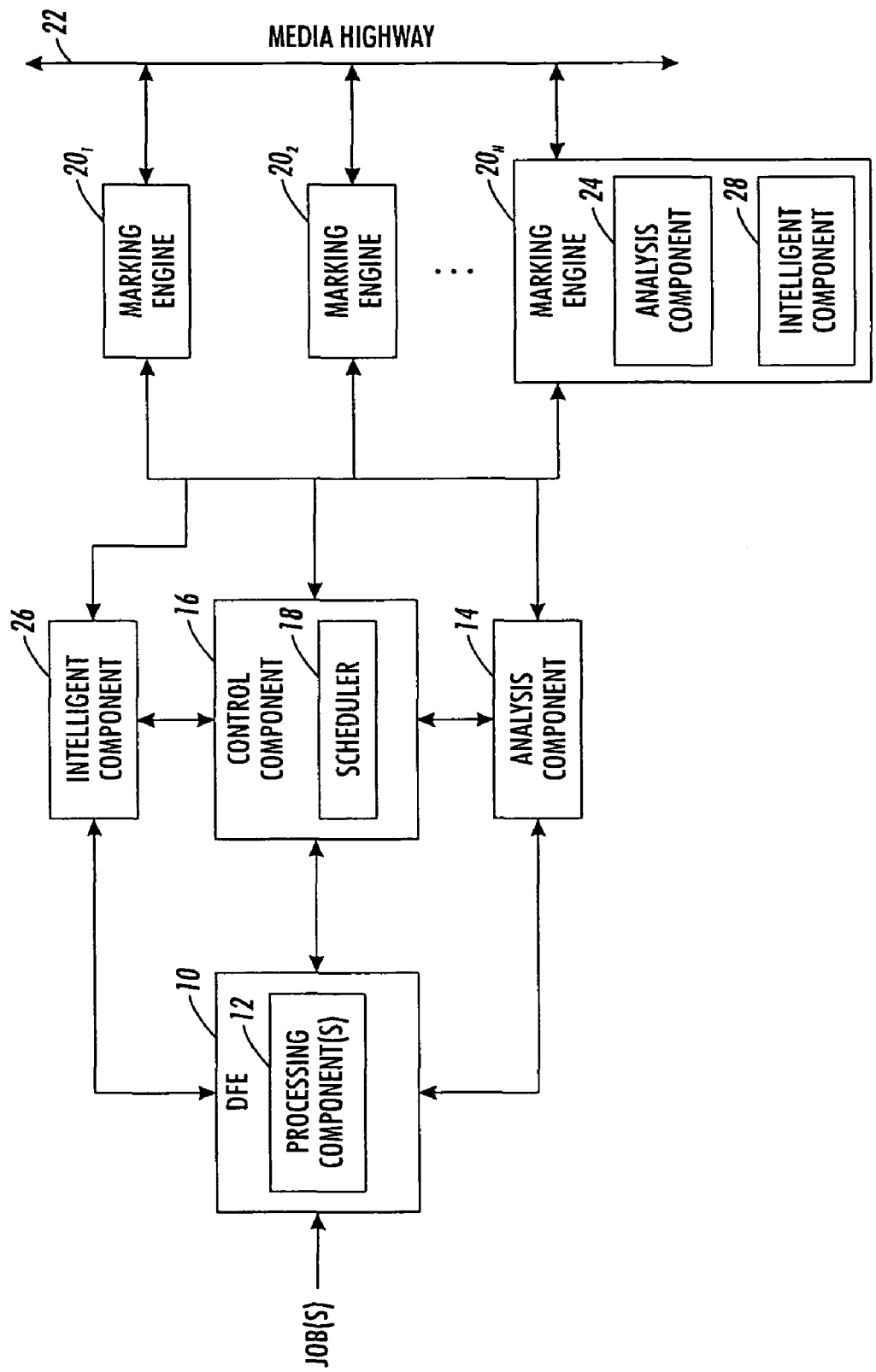
FIG. 4 illustrates a print platform in which each marking engine may include an intelligence components that facilitate determining marking engine health.

In FIG. 4, at least one of the marking engines 20 further includes an intelligent component. In this example, the marking engine $20_N$ includes an intelligent component 28 and, optionally, the analysis component 24. Similar to the intelligent component 26, the intelligent component 28 can facilitate determining, anticipating, predicting, etc. the health of its marking engines $20_N$ and/or another of the marking engines 20 through statistics, probabilities, classifiers, neural networks, and the like. Optionally, the print system can also include the analysis component 14.

It is to be appreciated that in some instances, each of the marking engines 20 includes its own intelligent component 28. In such instances, the intelligent component 26 may or may not be included and/or used to determine marking engine health. Rather, each of the marking engines 20 would use its corresponding intelligent component 28 and/or an intelligent component 28 of another of the marking engines 20 to determine its health. In these instances, the intelligent component 26 can simply not be used, used as a back up system, used to capture redundant information, used to valid results, not be included within the print system, etc.

Figure 5:
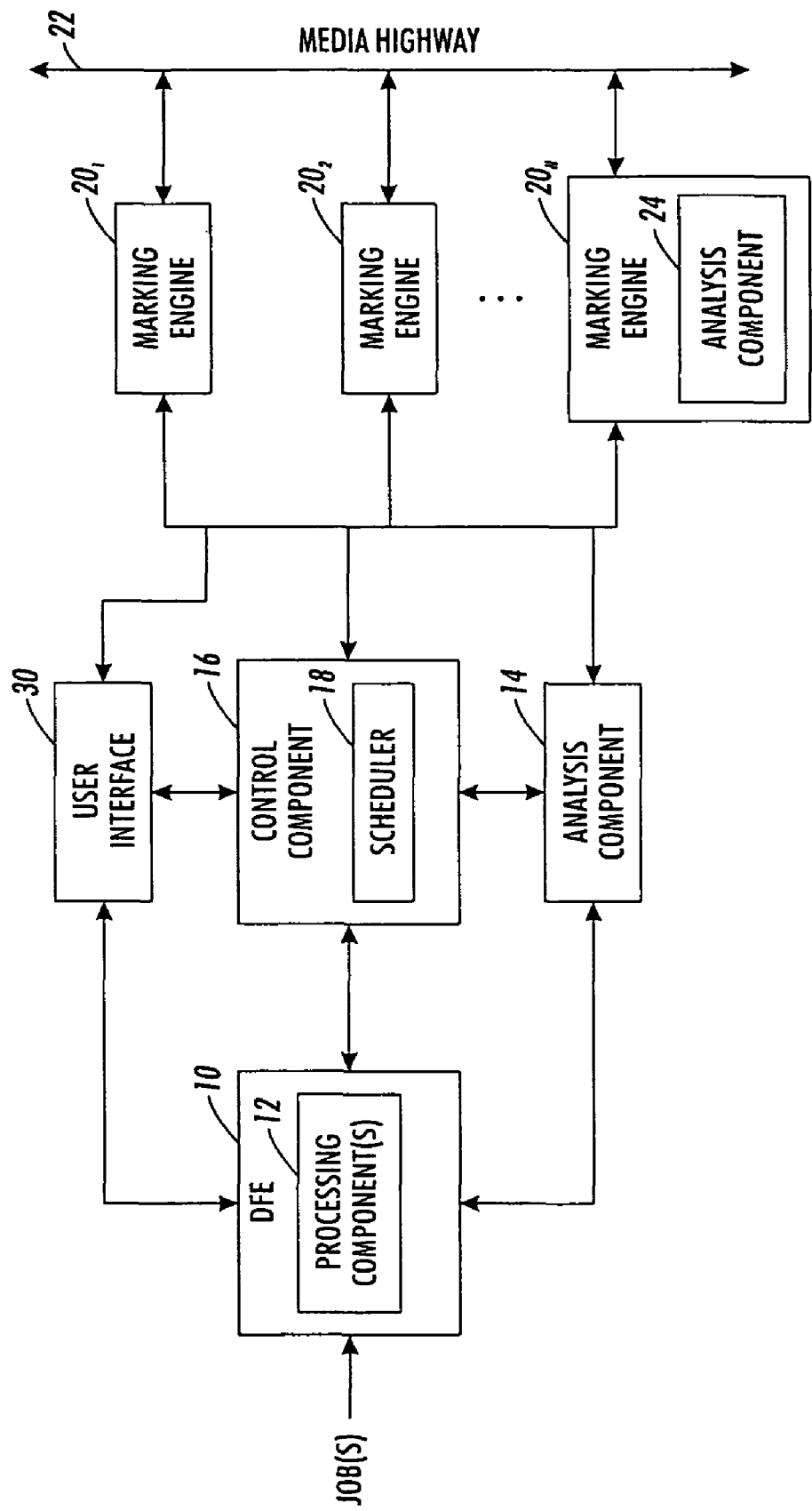
FIG. 5 illustrates a print platform with a user interface for manually providing job content and/or marking engine health information.

In FIG. 5, the print systems further includes a user interface 30, which can be used to manually invoke test procedures and/or provide health and/or job content information to the print system. Thus, the print system can be instructed to process one or more test patterns with one or more of the marking engines 20 and the resultant image(s) can be analyzed off-line. The results of the test can then be entered via the user interface 30 and/or other input mechanism (e.g., communications port, etc.). As described above, the scheduler 18 can leverage this (marking engine health and/or job content) information when developing the processing strategy to determine which of the marking engines 20 will process which portion of a job in order to minimize the visibility of image quality defects and/or improve productivity through optimally using each of the marking engines 20.

Figure 6:
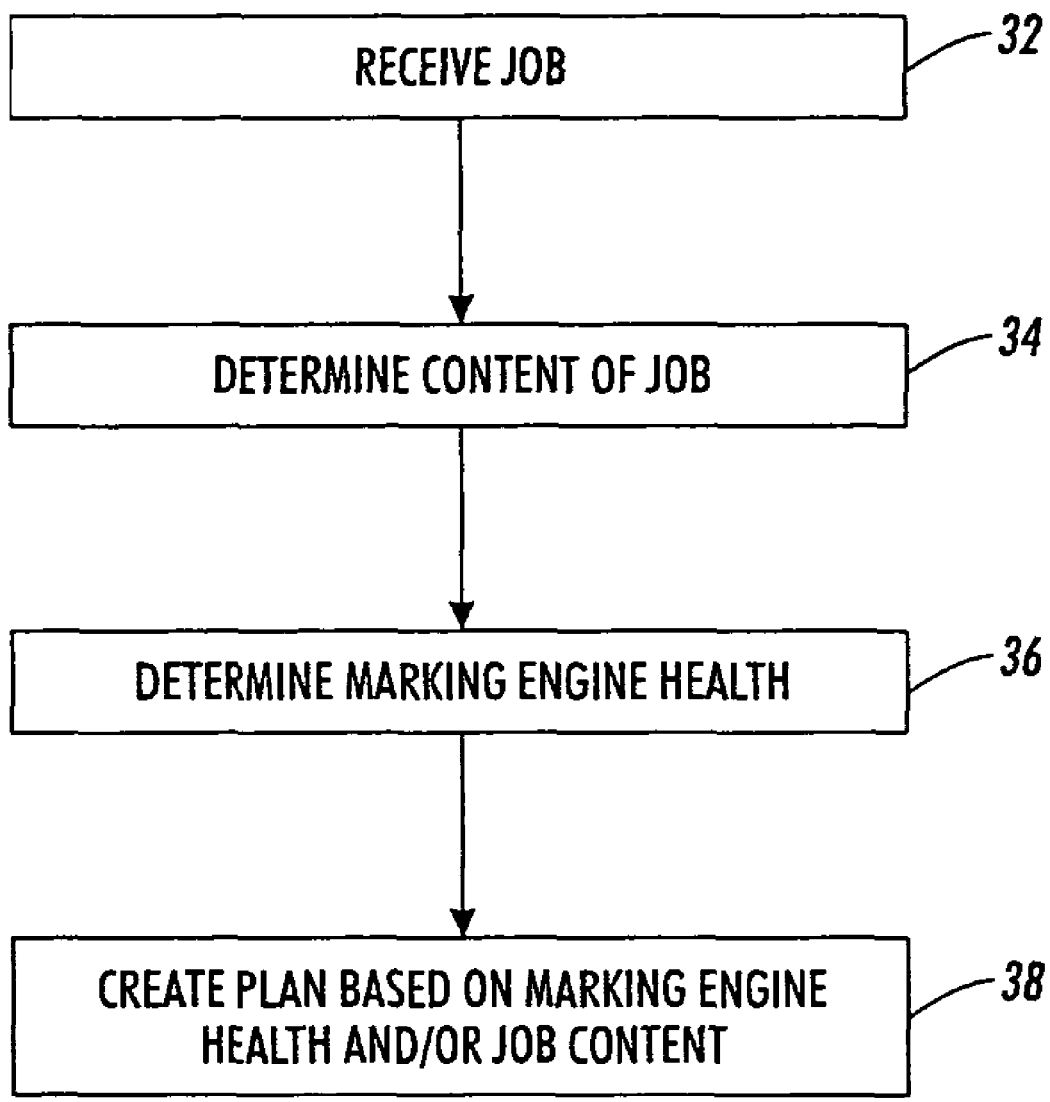
FIG. 6 illustrates a method for using marking engine health and/or job content information to facilitate processing jobs with minimal visible defects.

FIG. 6 illustrates a method for decreasing the visibility of defects (e.g., streaks, non-uniformities, low color variations, etc.) in the images reproduced by a single or multi-purpose print platform. This is achieved by leveraging knowledge about marking engine health, job content, print media characteristics, and/or other information associated with one or more of components of the print platform. In addition, such information can be used to maximize the processing capabilities by minimizing marking engine idle time.

It is to be appreciated that the acts and the order of the acts discussed below are not limiting. Thus, in other instance, the method can include similar and/or different, more or less, etc. acts in a similar or different order. For example, the below method describes determining the content of a job prior to describing determining the health of a marking engine. However, the health can be determined prior to, concurrently with, and/or after the job content, and vice versa.

At reference numeral 32, a job is received. Such job can originate from various sources such as CD, DVD, optical disk, Flash memory, stick memory, magnetic tape, floppy disk, etc., via wire or wirelessly over a bus, a network, or the like, from a computer, another print platform, an email server, a facsimile, etc. At 34, the content of the job is determined. For instance, each job can include one or more pages with black and white, highlight color portions, color, etc. portions, and/or text, graphics, pictures, etc. Such content can be determined from the received data and/or from data converted, translated, re-formatted, transformed, etc. to a suitable form by one or more raster image processors (RIPs) and/or other processing components. In addition, artificial intelligence or machine learning can be used to facilitate job content.

At 36, before, during and/or after determining the content of a received job, the health and/or other information (e.g., processing speed, toner type, capabilities, image quality, image resolution, etc.) about one or more of the marking engines of the print system is determined. The health and/or other information can be determined by a common component that oversees one or more of the marking engines and/or each marking engine can determine its own health. Such components can perform and/or invoke various tests, analyze final images, measure electrical, optical, and/or mechanical functionality, etc. In addition, artificial intelligence or machine learning can be used to facilitate determining health.

At 38, the content of the job and/or the health of the marking engines are used to create a plan to process the job. Such plan may leverage such information to minimize re-producing images with visible defects such as streaking, non-uniformities, low color variations, etc. through selecting which of the marking engines will process which portion of a job. Using such information can improve image quality through minimizing the visibility of defects and/or improve productivity and extend marking engine useful life by enabling use of a marking engine that would otherwise be idle due to the defect(s) exhibited by that marking engine. Optionally, the other techniques can be additionally or alternatively employed to facilitate reducing the visibility of defects. For example, the orientation (e.g., rotation and/or translation) of the image data and/or print media can be suitably changed to minimize the visibility of defects like streaks as discussed above. For instance, the print media orientation may be changed from long edge feed to short edge feed in order to minimize the visibility of various defects in the final image.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A multi-functional multi-engine print platform, comprising:
   a digital front end that receives a job for processing by the platform;
   at least two marking engines that process jobs;
   a marking engine analyzer that determines image quality defects of the at least two marking engines;
   a job analyzer that determines a content of the job;
   an intelligence component that monitors characteristics of at least one of the at least two marking engines and compares the monitored characteristics against measurements and pattern statistics from operable and inoperable marking engines to track trends indicative that the first one marking engine is transitioning from an operative state to a defective state; and
   a scheduler being operative to receive transition trends corresponding to a state of the at least two marking engines, the scheduler further operative to create a plan to process the job based on content of the job by using the first one of the at least two marking engines determined as producing or transitioning toward producing defects for rendering a first portion of the job that is not subject to incurring an image defect and continuing use of a second one of the at least two marking engines for rendering a second portion of the job that is subject to incurring the image defect if rendered by the first one such that a visibility of the defect is minimized in images reproduced by the at least two marking engines.

2. The multi-functional multi-engine print platform as set forth in claim 1 wherein the multi-functional multi-engine print platform is a distributed system.

3. The multi-functional multi-engine print platform as set forth in claim 1, wherein the scheduler uses the image quality defects and job content to optimize marking engine availability and use.

4. The multi-functional multi-engine print platform as set forth in claim 1, further including at least one processing component that transforms the job into a format suitable for processing by the at least two marking engines, wherein the content of the job is determined from one or more of the job and the transformed job.

5. The multi-functional multi-engine print platform as set forth in claim 1, further including an intelligent component that employs at least one of statistics, probabilities, classifiers, and neural networks to facilitate at least one of determining, anticipating and predicting the image quality defects of the at least two marking engines.

6. The multi-functional multi-engine print platform as set forth in claim 5, wherein each of the at least two marking engines includes its own intelligent component.

7. The multi-functional multi-engine print platform as set forth in claim 5, wherein the intelligent component further facilitates creating the job processing plan.

8. The multi-functional multi-engine print platform as set forth in claim 1, wherein the marking engine analyzer determines the image quality defects for each of the at least two marking engines or each of the at least two marking engines includes its own marking engine analyzer to self-determine its image quality defects.

9. The multi-functional multi-engine print platform as set forth in claim 1, wherein the marking engine analyzer determines the image quality defects based on one or more of a predetermined frequency, arrival of a new job to process, a marking engine capability change, and on-demand.

10. The multi-functional multi-engine print platform as set forth in claim 9, wherein the marking engine capability change is associated with one or more of a cleaner, a charger, an expose unit, a developer, a photoreceptor, and an intermediate transfer belt associated with the marking engine.

11. A method of a xerographic device for reducing visibility of marking engine image quality defects, comprising:
   determining a defect state of one or more marking engines of a print platform based on a determined image quality defect, the determining including:
      using an intelligence component, monitoring characteristics of at least a first marking engine,
      comparing the monitored characteristics against pattern statistics obtained from operable and inoperable marking engines, and,
      using the comparisons, determining a trend indicative that the first marking engine is transitioning from an operative state to a defective state;
   determining a content of a job;
   providing a first portion of the job to the first marking engine for rendering the first portion that is not subject to incurring the image defect and providing an operative second marking engine with a second portion of the job that is subject to otherwise incurring the image defect by the first marking engine such that a visibility of the image defect is minimized in images reproduced by the one or more marking engines.

12. The method of a xerographic device as set forth in claim 11, further including employing at least one of the image quality defects and the job content to select a marking engine that would otherwise sit idle due to the image quality defects exhibited by the marking engine.

13. The method of a xerographic device as set forth in claim 11, further including employing intelligence to facilitate at least one of determining the one or more image quality defects, the content of the job, and creating a plan to process the job based on one or more of the one or more image quality defects and the content of the job.

14. The method of a xerographic device as set forth in claim 11, further including determining the image quality defects based on one or more of a predetermined frequency, arrival of a new job to process, a marking engine capability, and on-demand.

15. The method of a xerographic device as set forth in claim 11, further including determining the image quality defects from one or more of a cleaner, a charger, an expose unit, a developer, a photoreceptor, and an intermediate transfer belt associated with the one or more marking engines.

16. A xerographic device, comprising:
   a digital front end that receives a job for processing by a print platform;
   a job analyzer that determines a content of the job;
   at least two marking engines that processes jobs;
   an intelligence component that monitors characteristics of the at least two marking engines and compares the monitored characteristics against measurements and pattern statistics from operable and inoperable marking engines to track trends indicative that the first marking engine is transitioning from an operative state to a defective state;
   a marking engine analyzer that determines image quality defects of the at least two marking engines using the monitored trends; and
   a scheduler operative to determine a health state of the two marking engines based on the determined image quality defects, the scheduler further operative to assign a first portion of the job likely to not incur image defects to the first marking engine that is determined as producing in the defective state such that the first marking engine is not idle, the scheduler further operative to assign a second portion of the job to the second marking engine determined as producing in an operative state, wherein neither of the two marking engines produce an image defect in a rendered job despite a determined defective state of at least one of the two marking engines.

17. The xerographic device as set forth in claim 16, wherein the scheduler employs at least one of the image quality defects and the job content to select a marking engine that would otherwise sit idle due to the image quality defects exhibited by the marking engine.

* * * * *